(12) United States Patent
Morrione et al.

(10) Patent No.: US 11,157,122 B1
(45) Date of Patent: Oct. 26, 2021

(54) METHOD TO DESIGN LOW VISIBILITY METAL MESH TOUCH SENSOR

(71) Applicant: FUTURETECH CAPITAL, INC., Palo Alto, CA (US)

(72) Inventors: Michael Morrione, Jackson, CA (US); Jeffrey Hawthorne, Palo Alto, CA (US)

(73) Assignee: FUTURETECH CAPITAL, INC., Palo Alto, CA (US)

( * ) Notice: Subject to any disclaimer, the term of this patent is extended or adjusted under 35 U.S.C. 154(b) by 0 days.

(21) Appl. No.: 16/891,393

(22) Filed: Jun. 3, 2020

(51) Int. Cl.
*G06F 3/044* (2006.01)

(52) U.S. Cl.
CPC .......... *G06F 3/0445* (2019.05); *G06F 3/0446* (2019.05); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2015/0070294 A1* | 3/2015 | Guard | ................... | G06F 3/0446 345/174 |
| 2016/0170541 A1* | 6/2016 | Iwami | ................... | H05K 9/009 345/174 |
| 2016/0282972 A1* | 9/2016 | Shu | ........................ | G06F 3/0446 |
| 2017/0269728 A1* | 9/2017 | Donnelly | .............. | G06F 3/0446 |

* cited by examiner

*Primary Examiner* — Christopher J Kohlman
(74) *Attorney, Agent, or Firm* — Womble Bond Dickinson (US) LLP; Joseph Bach, Esq.

(57) ABSTRACT

Touchscreen having a display device and a touch sensor adhered to the display device via optically clear adhesive; wherein the touch sensor comprises a transparent substrate; a top metal mesh divided into channels; a bottom metal mesh divided into channels; each of the top and bottom metal meshes having line spacing calculated to avoid first order moiré patterns and then the intersections of the lines randomized to avoid secondary order moiré patterns.

20 Claims, 5 Drawing Sheets

METHOD TO DESIGN LOW VISIBILITY METAL MESH TOUCH SENSOR

TECHNICAL FIELD

Embodiments of the present disclosure relate generally to touch screens. More particularly, embodiments of the disclosure relate to touch sensors with low visibility micro-mesh pattern.

BACKGROUND

A touch screen enabled system allows a user to control various aspects of the system by finger touch or stylus motion on the screen. A user may interact directly with one or more objects depicted on a display device by fingers or stylus that are sensed by the touch sensor. The touch sensor typically includes a conductive pattern disposed on a substrate configured to sense the exact position of the finger or stylus. Touch screens are commonly used in consumer, commercial, and industrial systems.

Generally, a touchscreen is made of two parts: the display screen and the touch sensor—both of which are generally in the form of grids. Regardless of the screen technology used (LCD, LED, OLED, etc.), the display screen is made up of rows of pixels in a grid pattern, e.g., 1920 rows each having 1080 pixels for an 1080p HD display or 3840 rows of 2160 pixels each for a 4 k Ultra HD display. The touch sensor is also a grid pattern made up of lines of conductors criss-crossing each other to form addressable points of contact.

The conductive pattern of touch screens has been traditionally made from transparent conductive material, such as indium tin oxide (ITO). However, with the advent of multi-touch screen systems and large displays, it is advantageous to have highly conductive micro mesh systems, for example, conductive metal mesh systems using copper fine lines. Copper is a much better conductor than transparent conductors such as ITO. However, there are a number of challenges with highly conductive metallic mesh touch sensors. Copper, as is well known, tends to degrade rather rapidly if not well protected. Therefore, a second metal layer, such as palladium or nickel, is plated over the copper conductor layer to help passivate the copper and reduce oxidation. The second metal layer of palladium or nickel serve to reduce the visibility of light reflected off of the copper conductor, but at the same time cause other visibility issues as they are opaque.

Generally, the design of the wire mesh calls for the wire lines to be sufficiently thin so that individually they are not visible to the user. However, due to their periodic design they are susceptible to forming moiré patterns. These patterns will be visible to the user and, therefore, should be avoided.

The moiré patterns appear as a result of an interaction between similar repeated patterns that are overlaid and the patterns are displaced, rotated or have slightly different pitch from each other. The visual appearance of the moiré patterns depends on characteristics of the grid patterns and on the location of the observer. Touchscreen displays have patterns that are susceptible to forming moiré patterns, which may be visible to the user. Importantly, the grid of the touch sensor is made to be transparent to the user so as not to interfere with the user's viewing of the image displayed. If the grid of the touch sensor generates a moiré pattern, even if the conductors forming the grid itself may be invisible to the user, the moiré pattern will be visible. Therefore, a proper design of the grid needs to avoid generating moiré patterns.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Disclosed herein is a method for designing and manufacturing a touch sensor with a conductive metallic micro-mesh that is not visible to the user and avoids forming moiré patterns. The method provides a sensor that can be integrated with a display screen without obscuring the images displayed and without generating distracting artifacts.

In disclosed aspects, analytical or numerical methods are used to model the periodic design of the mesh and the display pixels to arrive at periodicity that minimizes forming moiré patterns. Then a window boundary is placed at the solution joints and randomization is inserted at each intersection to shift the intersection point from the solution to a random position within the window boundary. The size of the constraint window can be selected as a fraction of the periodic spacing arrived at by the analytical or numerical methods.

In an aspect of the disclosure, a method of manufacturing a touch sensor with grids that minimize moiré pattern is provided. The method comprises using a minimum transmission value and given thickness of a conductive line to calculate minimum mesh spacing; using given mesh specification to determine maximum mesh spacing that ensures each channel of the mesh includes at least two conductive lines; iteratively calculating moiré mesh spacing for each two pairs of conductive lines of top grid and bottom grid of the touch sensor to minimize moiré pattern; using the moiré mesh spacing to generate a top grid design and a bottom grid design; applying a constraint window at a location of each joint of the top grid design and bottom grid design; randomly displacing each joint within the constraint window to generate randomized top grid and randomized bottom grid; fabricating the top grid and the bottom grid on a transparent substrate according to the randomized top grid and randomized bottom grid. The method may also proceed by first finding a moiré mesh spacing solution for a first order moiré pattern and then randomizing the moiré mesh spacing solution to generate a randomized solution for secondary order moiré patterns.

In an aspect of the disclosure, a touch sensor with grids that minimize moiré pattern is disclosed. The touch sensor comprises a transparent substrate, a layer of catalytic photoresist patterns made of a catalytic photoresist composition, the catalytic photoresist composition including a photoresist and catalytic nanoparticles; a metal conductive layer with conductive patterns forming a conductive mesh having a plurality of joints over the layer of catalytic photoresist patterns; a metal passivation layer over the metal layer; wherein a position of each of the plurality of joints is randomized within a constraint window.

Disclosed aspect include a conductive mesh touch sensor comprising: a transparent substrate; a top metal mesh having a first pattern formed overtop surface of the transparent substrate; a bottom metal mesh having a second pattern formed over bottom surface of the transparent substrate; wherein each of the top metal mesh and the bottom metal mesh form a first set of non-straight lines crossing a second set of non-straight lines at a plurality of joints. Separation distance between each two joints is randomized up to a 10% constraint window and the spacing between each two non-straight lines of the first set and the second set generates grid spatial frequency greater than 50 cycles per viewing degree. Each of the first set of non-straight lines and the second set of non-straight lines are formed as a series of line segments, each line segment extending from one of the plurality of joints to adjacent joint of the plurality of joints. Also, each of the line segments may be angled at a different orientation from other line segments of the non-straight line.

In further aspects of the disclosure, a touch screen is provided having touch sensor with a metallic conductive micro-mesh. The touch screen comprises a display layer, e.g., an LCD, an OLED, etc., and a touch sensor adhered to the display layer with an optically clear adhesive. The touch sensor comprises a transparent substrate; a top metal mesh having a plurality of top joints; a bottom metal mesh having a plurality of bottom joints; wherein positioning of each of the plurality of top joints and each of the plurality of bottom joints is randomized within a constraint window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the inventive touch sensor and methods for its fabrication will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments but are not limited to the disclosed embodiments. That is, the features disclosed herein are not limited to the embodiment within which they are described but may be "mixed and matched" with other features and incorporated in other embodiments.

Figures 1, 2:
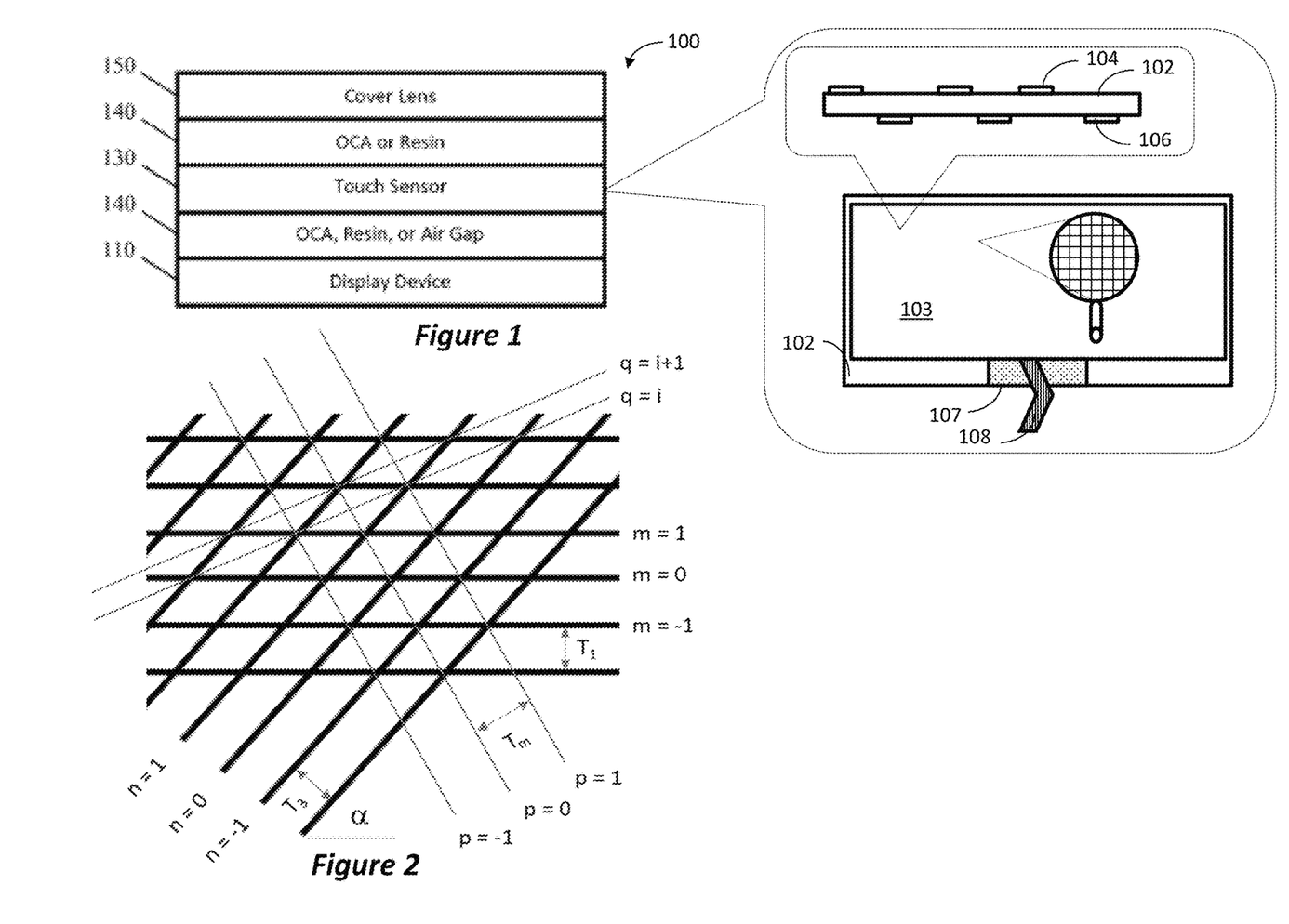
FIG. 1 illustrates a cross-section of a touch screen for implementing a mesh design according to disclosed embodiments.
FIG. 2 is a simplified schematic illustrating linear grids for developing the analytical solution for moiré patterns.

FIG. 1 shows a cross-section of a touch screen 100 which may implement a touch sensor in accordance with embodiments of the present disclosure. Touch screen 100 includes a display device 110 (e.g., LCD, OLED, etc.) and a touch sensor 130 that overlays at least a portion of a viewable area of display device 110. In certain embodiments, an optically clear adhesive ("OCA") or resin 140 may bond the bottom side of touch sensor 130 to the top, or user-facing, side of display device 110. In other embodiments, an isolation layer or air gap 140 may separate the bottom side of touch sensor 130 from the top side of display device 110. A transparent cover lens 150 may overlay the top side of touch sensor 130. The transparent cover lens 150 may be composed of polyester, glass, or any other material suitable for use as a cover lens 150. In certain embodiments, an OCA or resin 140 may bond the bottom side of the transparent cover lens 150 to the top, or user-facing, side of touch sensor 130. The top side of transparent cover lens 150 faces the user and protects the underlying components of touch screen 100. Incidentally, in this disclosure the term top or upper refers to the side facing the user when the touch screen is in use, while bottom or lower indicate the direction away from the user.

The components and/or the stack of touch screen 100 may vary based on an application or design while still implementing mesh design according to embodiments of the present disclosure. For example, the touch sensor 130, or the function that the touch sensor implements, may be integrated into the display device 110 stack (not independently illustrated).

The callout in FIG. 1 illustrates a cross-section of a small section of the touch sensor 130 and a top view of a generic layout of a touch sensor 130. Generally, the touch sensor 130 comprises a transparent substrate 102, which may be larger than the viewable area of the display device. The transparent substrate 102 includes a touch sensing area 103, upon which a top conductive mesh 104 and a bottom conductive mesh 106 are formed. As illustrated by the magnifying-glass caricature, the top mesh 104 and the bottom mesh 106 form grids having plurality of addressable intersections, also referred to as joints. The position of the finger touch or stylus on the sensor is sensed at the intersections and the signal is transmitted to contacts at the bond pads area 107. A flex cable 108 is attached to the contacts of the bond pad area to transmit the signal to the processor of the touch screen.

The placement of a metal mesh touch sensor on top of an LCD or OLED display represents two superposed repeated structures, which results in an undesired moiré pattern. The resultant moiré pattern is a series of periodic bright and dark lines visible when a repeated structure of an LCD and a metal mesh touch sensor are superposed. The goal of a sensor design is to eliminate or significantly reduce the visibility of the moiré pattern to the observer. Theoretically the moiré pattern can be eliminated by perfect alignment of the repeated patters. However this is impractical as the patterns of the display and the sensor are not identical. However, the moiré pattern can be less visible to the observer by changing the period of moiré pattern.

Human vision has a contrast sensitivity that is a function of the period of lines observed. The eyes' sensitivity to the pattern falls off rapidly for higher frequencies of the lines, with respect to the vision angle. Eventually a high spatial frequency is reached that requires a contrast of 1.0 to detect, which is referred to as the high frequency cutoff. Spatial frequencies higher than this cutoff frequency cannot be detected by an observer. The goal of the metal mesh touch sensor designer is to adjust the repeated mesh pattern relative to the repeated LCD pattern so that the resulting moiré period (or frequency=1/period) is close to or beyond the high frequency cut off.

The high frequency cut off occurs at approximately 50 cycles/degree of viewing angle. A typical viewing distance is 400 mm-800 mm for desktop or laptop display with a diagonal size of 13"-17". At this viewing distance the high frequency cut off for a moiré pattern would be a fringe spacing of 140 μm-280 μm. Therefore, it required to have an understanding how moiré frequency changes as a function of the design of the repeated metal mesh pattern superposed on the repeated LCD pattern.

There are many approaches to investigate the moiré effect. In some cases, solutions can be found from direct analytical considerations, while other solution can be derived numerically. The indicial method can be used to find locations of the characteristic points (minima or maxima) of the patterns. The indicial and direct approaches require simplification, such as a simplified structure, small angles, smooth functions (nearly sinusoidal), etc.

The indicial equation is an analytical method to calculate the characteristic locations of fringes, implying that the locations of the minima and maxima of gratings are known. In this approach, a line grating is modeled by a series of thin lines (a sketch of a family of lines), i.e., a wireframe of the maxima (or minima) only, with the intensity profile ignored. The lines of the moiré bands connect the intersections of these families of lines of gratings. Moiré bands occur in a grating superposition since areas where black lines of the two grating cross each other contain less black than areas where the grating lines fall between each other. Therefore, the bright bands of the most visible moiré run along lines which connect closest crossing points. As soon as the equations of these intersections can be calculated based on the given equations of the families, technically the equations of the moiré bands can be found as analytical expressions.

FIG. 2 is a simplified schematic illustrating linear grids for developing the analytical solution. One grid is defined by repeated lines indexed by m and the other grid is defined by repeated lines indexed by n. The brightest moiré bands and the lower frequency moiré bands occur along the centerline defined by indexed line p. Other bright moiré bands occur along the centerline defined by indexed line q, however these lines are higher frequency and lower brightness.

The p-th line is defined by condition p=m−n. Using this relationship and the equations for the m-lines and the n-lines, the following equation for the spacing (period) of the p-th moiré lines can be found.

$$T_m = T_3 \div \sqrt{(T_1^2 - 2 \times T_1 \times T_3 \times \cos\alpha + T_3^2)} \quad (1)$$

The indicial equation (1) for moiré period shows that higher moiré pattern frequencies are obtained when T3 is smaller than T1 and as the orientation angle ($\alpha$) approaches 90 degrees.

Figure 3:
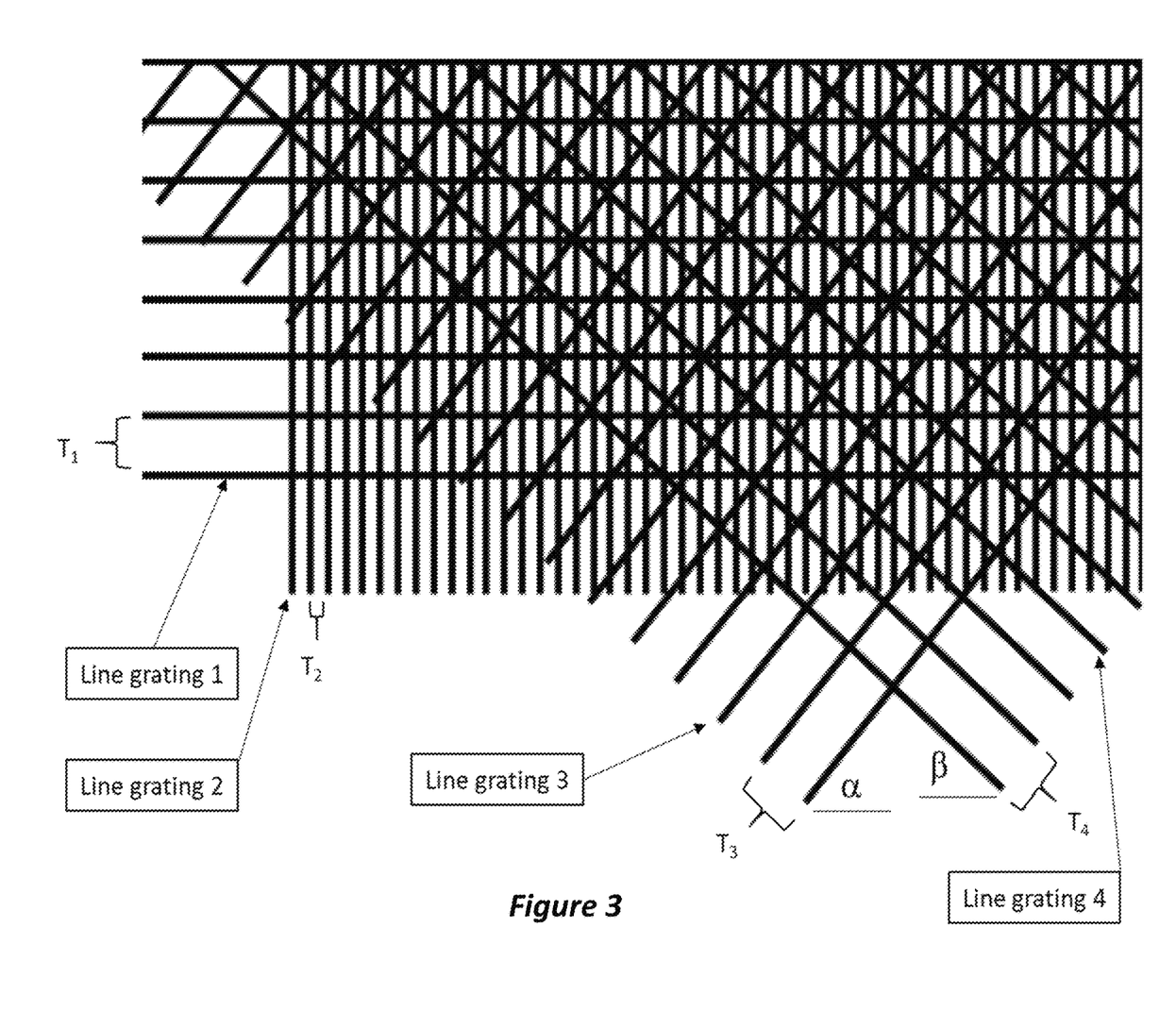
FIG. 3 is a simplified schematic modeling two dimensional grids, like an LCD or a metal mesh sensor, as superposed layers of two indexed line gratings.

FIG. 3 is a simplified schematic modeling two dimensional grids, like an LCD or a metal mesh sensor, as superposed layers of two indexed line gratings. The moiré pattern is multiplicative in the case of superposed gratings. The moiré pattern frequencies can be modeled to first order by equation (1.0) for four combinations of line gratings. Two superposed line gratings that comprise the LCD and two superposed line gratings that comprise the metal mesh sensor.

Analyzing the metal mesh spacing over a range of distances and the mesh angles over a range of angles, the ideal spacing for T3 and T4 and angle values for $\alpha$ and $\beta$ can be established that result in a moiré pattern frequency near or above the human vision high cut off frequency.

As illustrated in the callout of FIG. 1, the metal mesh sensor is comprised of a top and bottom mesh lines that are offset by half the mesh spacing in either direction. This has the effect of doubling the moiré frequency given that both front and back mesh lines are superposed on the LCD grid.

Moiré reduction is not the only consideration for determining the spacing of the conductors in the metal mesh touch sensor. The other considerations are the light transmission (conductor (opaque) area to open (transparent) area) and mesh conductor electrical connection redundancy per touch sensor node (channel).

Figures 4, 5, 6:
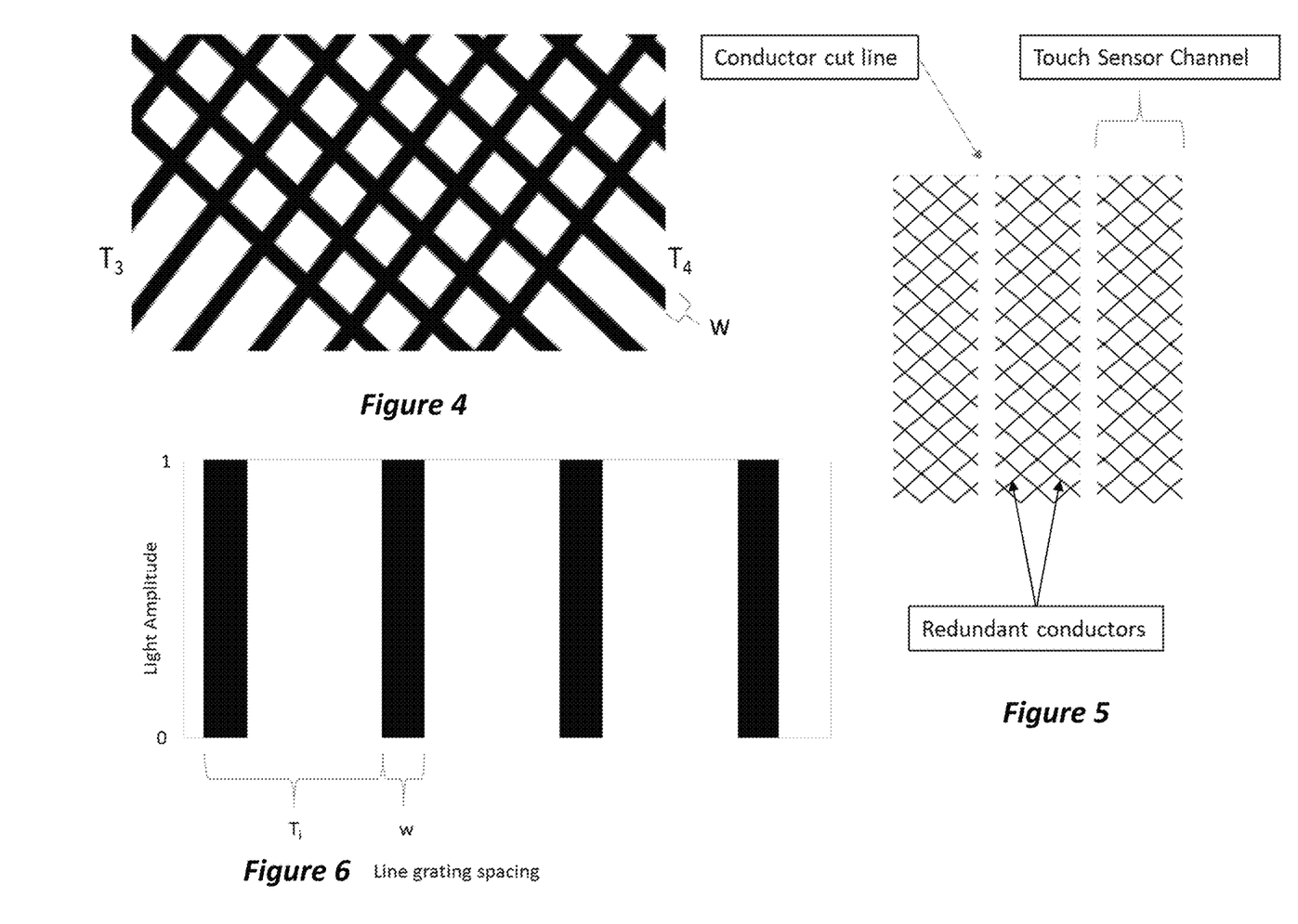
FIG. 4 is a simplified schematic used for modeling light transmission.
FIG. 5 illustrates a pattern cut to form the individual channels with electrical isolation in between the channels.
FIG. 6 is a simplified schematic illustrating the modeling of the grating lines.

FIG. 4 is a simplified schematic used for modeling light transmission. From FIG. 4, the light transmission can be expressed as:

$$\text{Transmission} = 1 - \frac{w}{T_3} - \frac{w}{T_4} + \frac{w^2}{(T_3 * T_4)} \quad (2)$$

Assuming line width w is the same for all lines. For spacing $T_3$ about the same as spacing $T_4$ and line width w much smaller than the spacing $T_3$ equation (2) becomes:

$$\text{Transmission} = 1 - 2 * w/T_3 \quad (3)$$

Touch sensors comprise of arrays of copper conductors that are patterned to form the transmit (Tx) and read (Rx) channels. The pattern on one side forms the Tx channel and the pattern on the other side forms the Rx channel, together forming a mutual capacitance touch sensor. The patterned copper conductors have a width of up to 5-micron to make them individually invisible to the user. Taking an example of a 4 micron line width, i.e., w=4 μm, the transmission is 90% and spacing $T_3$ is 80 μm. Since there are grids on both the top and bottom of the sensor, spacing $T_3$ is doubled to 160 μm. Thus, light transmission of the metal mesh touch sensor will determine the lower limit allowed for conductor spacing $T_3$ and $T_4$.

Conductor electrical connection redundancy in each touch sensor channel is the other spacing consideration. Conductor redundancy increases the conductance of the sensor channel and improves manufacturing yield in the case that an individual mesh conductor line is damaged during manufacturing. A touch sensor will have rows and columns of electrodes (channels) in two layers (top and bottom). The spacing of a channel is typically 3 mm to 5 mm. The conductors can have a variety of geometries, such as simple "bar and stripe" to more complex "interlocking diamond pattern." In a metal mesh touch sensor, the individual channels are formed by patterning breaks in the individual conductors of the mesh, as illustrated in FIG. 5.

The example of FIG. 5 illustrates a diamond pattern cut into individual channels with electrical isolation in between the channels. The design of the touch sensor channel electrode (size and geometry) will determine the maximum spacing for the metal mesh conductor spacing in order to have at least two redundant conductors per touch sensor channel.

As shown above, the indicial method provides a straightforward method of modeling display and metal mesh touch sensor as a combination of line gratings. This allows design of the conductor spacing and orientation relative to the display pixels to minimize the visibility of the first order moiré pattern generated. In actual practice, metal mesh conductor lines and the spacing between the display pixels have a finite width and a specific intensity profile. In addition, display pixels are not a perfect rectangular grid. In LCD display the rectangle defining the pixel will have a notch in the corner for thin film transistor to control the pixel. Some LCDs do not have rectangular pixels, although they do have a repeated structure. The finite widths and non-rectangular structure are repeated structures and will produce additional higher order moiré patterns. The higher order moiré pattern generated will have a lower contrast; however it may be at a spatial frequency that is within the human vision sensitivity.

FIG. 6 is a simplified schematic illustrating the modeling of the grating lines. Grating lines have width and should be modeled as a rectangular wave function. The rectangular wave function can be expressed as a Fourier series expansion.

$$f(x) = \frac{w}{T} + \sum_{i=1}^{\infty} \frac{2}{(i\pi)} * \sin\left(\frac{\pi i w}{T}\right) * \cos\left(\frac{2\pi i}{T} * w\right) \tag{4}$$

The two-dimensional grid is actually comprised of an infinite series of sin and cos waves with higher order frequencies or harmonics. While it is possible to analyze moiré patterns generated from more complex repeated structures—and take into consideration higher order harmonics from structures with finite width—the analysis is usually performed using numerical computational model performed in the frequency domain through Fourier transforms. However, computational methods do not necessarily provide a closed solution to the touch sensor conductor mesh spacing and orientation. On the other hand, while the indicial method provides a straightforward model to address the highest contrast first order moiré pattern, it does not consider moiré patterns generated from higher order harmonics or modifications to the rectangular pattern.

To account for the higher order moiré pattern, according to disclosed embodiments once an analytical or numerical solution is obtained to account for the first order moiré pattern, a minor randomization is introduced into the solution. For example, first the design of the metal mesh touch sensor repeated structure is found using the indicial method, and then minor randomization is introduced into the design. According to this embodiment, the design will effectively disrupt the higher order moiré pattern.

According to one embodiment, the process proceeds as follows. Once the initial mesh spacing and orientation has been established, a constraint window is defined. The constraint window may be a box shape of size (c)×(d), an ellipse with major axis of size (c) and minor axis of size (d), etc. Each constraint window is centered at the intersection of the designed mesh lines (both top and bottom). The dimensions of the constraint window are defined as percentage or fraction of the spacing in each grid direction.

Figure 7:
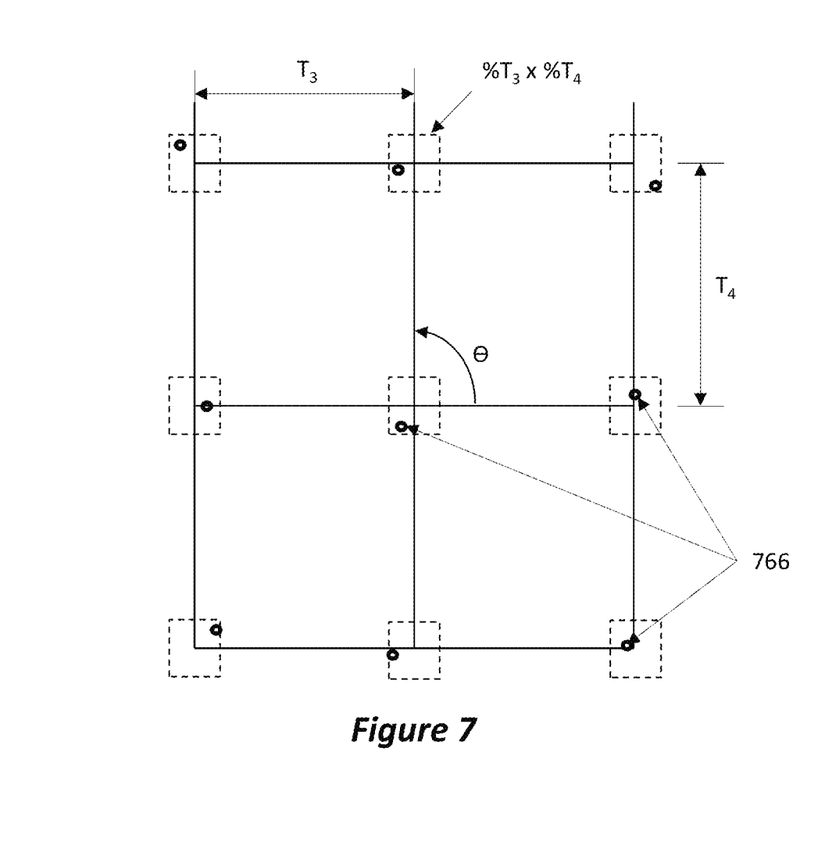
FIG. 7 illustrates an example of a grid design with constraint window according to an embodiment.
Figure 8:
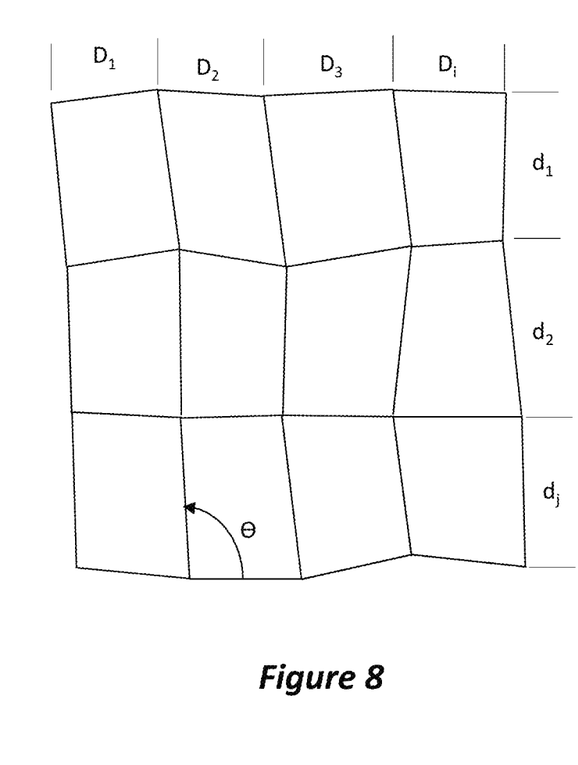
FIG. 8 illustrates a resulting grid after the randomization according to an embodiment.

FIG. 7 illustrates an example according to an embodiment. The grid was designed using minimum transmittance of 90% for a 4 micron line width. The indicial method was used to determine the spacing $T_3$ and $T_4$. Then, for each intersection (also referred to as a joint of the mesh lines) a constraint window having a size calculated as percentage of the spacing was applied. In this example, the percentage is 10% (although it can be set lower), so that the constraint window is of a size $0.1T_3 \times 0.1T_4$. For each calculated grid intersection, a new intersection point 766 was selected randomly within the constraint window. FIG. 8 illustrates the resulting grid after the randomization. The resulting minor randomization of the mesh spacing and orientation will effectively reduce the visibility of any higher (secondary) order moiré patterns generated from finite width line harmonics and non-rectangular display pixel geometries.

As can be seen from FIGS. 7 and 8, the first order solution produces line spacing for a grid that is made of a first set of straight lines crossing a second set of straight lines. In FIG. 7 all the lines of the first set are parallel to each other and all the lines of the second set are parallel to each other. Note that while FIG. 7 illustrates the lines crossing at 90 degrees, the crossing angle θ may be different from 90 degrees. Regardless, the crossing angle is the same at every joint.

After the randomization, the grid is made of first set of non-straight lines crossing a second set of non-straight lines, wherein each line of the first and second set is made up of a plurality of straight segments connected together to form the line, each segment being oriented at a different direction than other segments within the line, such that the segments in one line are not parallel to segments in adjacent lines. Also, after the randomization the grid is made of first set of lines crossing a second set of lines at a plurality of joints, wherein at each joint a crossing angle is different from a crossing angle at other joints. Similarly, a different separation distance $D_1$-$D_i$ and $d_1$-$d_j$ exists between each two joints.

Figure 9:
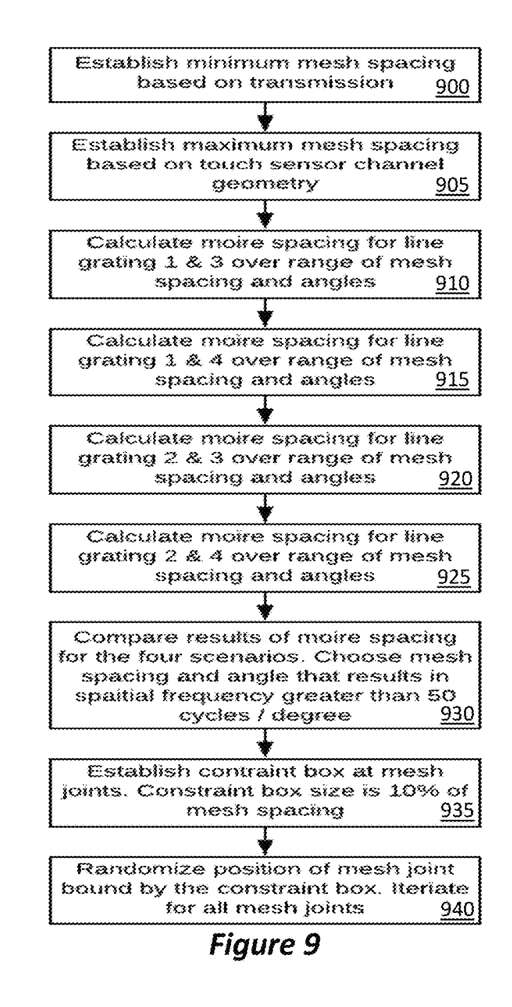
FIG. 9 illustrates a process for fabricating the wire meshes for a touch sensor according to an embodiment.

FIG. 9 illustrates a process for fabricating the wire meshes for a touch sensor. In this example a top grid and a bottom grid are considered, so that there are four line spacing—two for the top mesh and two for the bottom mesh. At step 900 the minimum mesh spacing is determined based on the transmission requirement and the line width. It is desired that transmission be at least 90%. At step 905, the maximum mesh spacing is established based on the specific channel geometry such that each channel has at least two conductive lines. This is done as redundancy measure in case of manufacturing defect. In steps 910-925 an analytical or numerical method, e.g., the indicial method, is used to calculate moiré spacing for each pair of lines for both the top and bottom grids. Each of these calculations can be done repeatedly for different values of spacing and different angles between the lines of the grids. At step 930 the results of the moiré spacing are compared to choose the mesh spacing that result in spatial frequency greater than 50 cycles per degree at a normal observation distance. Note that since the final product is a touch screen, the normal distance can be considered as no further than arm's length. At step 935 a constraint window is established of size determined as a fraction of the chosen moiré spacing. In this example, it is selected as 10% of the moiré spacing. At step 940 the position of each mesh joint is randomized within the constraint window.

Figure 10:
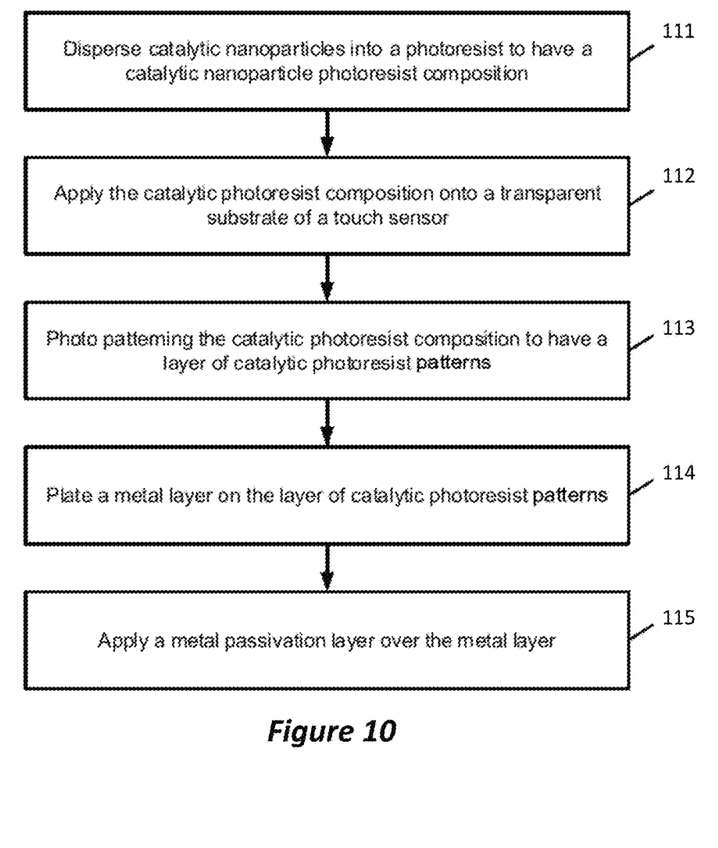
FIG. 10 is a flow chart illustrating a process for fabricating a touch sensor according to an embodiment.

FIG. 10 is a flow chart illustrating a process for fabricating a touch sensor according to an embodiment. In step 111 a catalytic photoresist composition is formed by dispersing catalytic nanoparticles into photoresist. This step does not necessarily form a part of the process, as the catalytic photoresist may be already premixed by a vendor. In some embodiments, the size of the catalytic nanoparticles may range from 5 to 250 nanometers, for example, the catalytic nanoparticles may have a size of 15-25 nanometers. The nanoparticles may be formed of silver and may be mixed into a standard commercially available photoresist.

At step 112, the catalytic photoresist composition is applied onto a transparent substrate of the touch sensor. In this embodiment, both sides of the substrate are formed with conductive mesh, so both sides are coated with the catalytic photoresist. At step 113 the catalytic photoresist is patterned according to the design obtained by the methods disclosed herein so as to avoid formation of first and secondary order moiré patterns. The patterning is done by exposure to UV radiation through a mask having the randomized design and then developing the catalytic photoresist.

At step 114 a metal layer is formed over the patterned catalytic photoresist. This may be done by electroless plating of metal, such as copper. By having catalyst nanoparticles in the photoresist composition, and then patterning the photoresist, the catalyst nanoparticles will form nucleation sites only over the developed photoresist, so as to form the mesh design. In step 115 an optional passivation layer is formed over the formed mesh. In the case of copper mesh, the passivation layer may be formed of palladium. Each of the resulting top and bottom metal meshes has randomized joints formed by non-straight lines and different joint angles.

Thus, in disclosed aspects a method of manufacturing a touch sensor with a conductive micro-mesh that minimize moiré pattern is provided, the method comprising: using a minimum transmission value and given thickness of a conductive line to calculate minimum mesh spacing; using given mesh specification to determine maximum mesh spacing that ensures each channel of a plurality of channels of the mesh includes at least two conductive lines; iteratively calculating moiré mesh spacing for each two pairs of conductive lines of top grid and bottom grid of the touch sensor to minimize moiré pattern; using the moiré mesh spacing to generate a top grid design and a bottom grid design; applying a constraint window at a location of each joint of the top grid design and bottom grid design; randomly displacing each joint within the constraint window to generate randomized top grid and randomized bottom grid; and, fabricating the top grid and the bottom grid on a transparent substrate according to the randomized top grid and randomized bottom grid.

The disclosure also encompasses a touchscreen having a display device; a touch sensor over the display device; and, an optically clear adhesive between the display device and the touch sensor; wherein the touch sensor comprises: a transparent substrate; a top metal mesh having a first pattern formed over top surface of the transparent substrate; a bottom metal mesh having a second pattern formed over bottom surface of the transparent substrate; wherein each of the top metal mesh and the bottom metal mesh form a first set of lines crossing a second set of lines at a plurality of joints, and wherein separation distance between each two joints is randomized to a set constraint window. Each of the top mesh and bottom mesh may further comprise isolation strips separating the top mesh and bottom mesh into a plurality of channels. Each line of the first set of lines and the second set of lines may comprise a plurality of line segments connected at corresponding joints of the plurality of joints. Each two line segments of a line connect at a joint at a different angle than other segments connected at other joints of the line. Each of the line segments is angled at a different orientation from other line segments of the line.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense. The moiré mesh spacing is selected to generate grid spatial frequency greater than 50 cycles per viewing degree. The method may include fabricating each of the top grid and the bottom grid as a first set of non-straight lines crossing a second set of non-straight lines at a plurality of joints. The method may further comprise forming a different separation distance between each two joints of the plurality of joints and/or forming the first set of non-straight lines cross the second set of non-straight lines at a different angle at each of the plurality of joints. Also, the method may comprise fabricating each of the top grid and the bottom grid as a series of line segments, each line segment extending from one of the plurality of joints to adjacent joint of the plurality of joints and forming each of the line segments at a different angular orientation. The method can also include cutting isolation strips in each of the top grid and the bottom grid to generate the plurality of channels.

While the present disclosure has been disclosed in example embodiments, those of ordinary skill in the art will recognize and appreciate that many additions, deletions and modifications to the disclosed embodiments and their variations may be implemented without departing from the scope of the disclosure. A wide range of variations to those implementations and embodiments described herein are possible. Components and/or features may be added, removed, rearranged, or combinations thereof. Similarly, method steps may be added, removed, and/or reordered.

Likewise, various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Accordingly, reference herein to a singular item includes the possibility that a plurality of the same item may be present. More specifically, as used herein and in the appended claims, the singular forms "a," "an," "said," and "the" include plural referents unless specifically stated otherwise. In other words, use of the articles allow for "at least one" of the subject item in the description above as well as the claims below.

Additionally, as used herein, a phrase referring to "at least one of" a list of items refers to any combination of those items, including single members. As an example, "at least one of: a, b, or c" is intended to cover: a, b, c, a-b, a-c, b-c, and a-b-c.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described as occurring in a particular order, this should not be understood as requiring that such operations be performed in the particular order described or in sequential order, or that all described operations be performed, to achieve desirable results. Further, other operations that are not disclosed can be incorporated in the processes that are described herein. For example, one or more additional operations can be performed before, after, simultaneously, or between any of the disclosed operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single product or packaged into multiple products. Additionally, other embodiments are within the scope of the following claims. In some cases, the actions recited in the claims can be performed in a different order and still achieve desirable results.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise. Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

What is claimed is:

1. A method of manufacturing a touch sensor with a conductive micro-mesh that minimize moiré pattern, the method comprising:
    using a minimum transmission value and given thickness of a conductive line to calculate minimum mesh spacing;
    using given mesh specification to determine maximum mesh spacing that ensures each channel of a plurality of channels of the mesh includes at least two conductive lines;
    iteratively calculating moiré mesh spacing for each two pairs of conductive lines of top grid and bottom grid of the touch sensor to minimize moiré pattern;
    using the moiré mesh spacing to generate a top grid design and a bottom grid design; applying a constraint window at a location of each joint of the top grid design and bottom grid design;
    randomly displacing each joint within the constraint window to generate randomized top grid and randomized bottom grid; and,
    fabricating the top grid and the bottom grid on a transparent substrate according to the randomized top grid and randomized bottom grid.

2. The method of claim 1, wherein the grid spacing is selected to result in moiré mesh spacing spatial frequency greater than 50 cycles per viewing degree.

3. The method of claim 2, comprises fabricating each of the top grid and the bottom grid as a first set of non-straight lines crossing a second set of non-straight lines at a plurality of joints.

4. The method of claim 3, further comprising forming a different separation distance between each two joints of the plurality of joints.

5. The method of claim 3, further comprising forming the first set of non-straight lines cross the second set of non-straight lines at a different angle at each of the plurality of joints.

6. The method of claim 3, further comprising fabricating each of the top grid and the bottom grid as a series of line segments, each line segment extending from one of the plurality of joints to adjacent joint of the plurality of joints.

7. A method of claim 6, further comprising each of the line segments at a different angular orientation.

8. The method of claim 3, further comprising cutting isolation strips in each of the top grid and the bottom grid to generate the plurality of channels.

9. A conductive mesh touch sensor comprising:
    a transparent substrate;
    a top metal mesh having a first pattern formed over top surface of the transparent substrate;
    a bottom metal mesh having a second pattern formed over bottom surface of the transparent substrate;

wherein each of the top metal mesh and the bottom metal mesh form a first set of non-straight lines crossing a second set of non-straight lines at a plurality of joints;
wherein spacing between each two non-straight lines of the first set and the second set generates moiré mesh spatial frequency greater than 50 cycles per viewing degree.

10. The touch sensor of claim 9, wherein separation distance between each two joints is randomized up to a 10% constraint window.

11. The touch sensor of claim 9, wherein the first set of non-straight lines crosses the second set of non-straight lines at a different angle at each of the plurality of joints.

12. The touch sensor of claim 9, wherein each of the first set of non-straight lines and the second set of non-straight lines are formed as a series of line segments, each line segment extending from one of the plurality of joints to adjacent joint of the plurality of joints.

13. The touch sensor of claim 12, wherein each of the line segments is angled at a different orientation from other line segments of the non-straight line.

14. The touch sensor of claim 9, wherein each of the top mesh and bottom mesh further comprises isolation strips defining a plurality of channels.

15. A touchscreen, comprising:
a display device;
a touch sensor over the display device; and,
an optically clear adhesive between the display device and the touch sensor;
wherein the touch sensor comprises: a transparent substrate; a top metal mesh having a first pattern formed over top surface of the transparent substrate; a bottom metal mesh having a second pattern formed over bottom surface of the transparent substrate; wherein each of the top metal mesh and the bottom metal mesh form a first set of lines crossing a second set of lines at a plurality of joints, and wherein spacing between each two lines of the first set and the second set generates moiré mesh spatial frequency greater than 50 cycles per viewing degree.

16. The touchscreen of claim 15, wherein each of the top mesh and bottom mesh further comprises isolation strips separating the top mesh and bottom mesh into a plurality of channels.

17. The touchscreen of claim 16, wherein each line of the first set of lines and the second set of lines comprises a plurality of line segments connected at corresponding joints of the plurality of joints.

18. The touchscreen of claim 17, wherein each two line segments of a line connect at a joint at a different angle than other segments connected at other joints of the line.

19. The touchscreen of claim 17, wherein each of the line segments is angled at a different orientation from other line segments of the line.

20. The touchscreen of claim 15, wherein separation distance between each two joints is randomized to a set constraint window.

* * * * *